UNITED STATES PATENT OFFICE.

WILLIAM BULLUS MIDDLETON, OF LANCASTER, PENNSYLVANIA.

PROCESS OF TREATING STEEL.

SPECIFICATION forming part of Letters Patent No. 448,534, dated March 17, 1891.

Application filed June 19, 1889. Serial No. 314,834. (No specimens.)

*To all whom it may concern:*

Be it known that I, WILLIAM BULLUS MIDDLETON, a citizen of the United States, residing at Lancaster, in the county of Lancaster, in the State of Pennsylvania, have invented a new and useful Improvement in the Process of Treating Steel, of which the following is a specification.

Upon the eighth day of November, 1887, Letters Patent of the United States, No. 372,696, were granted to me for a method of welding steel, which consists in treating the pieces of steel to be welded together with a solution of silicate of soda, or with a solution of other silicate, or with a solution of silica, and in then, at a welding heat, subjecting said pieces to a welding pressure between rolls, under the hammer, or otherwise.

Subsequent to the grant of the foregoing Letters Patent, I discovered that by heating Bessemer or other well known kinds of steel with silica, silicate of soda, or other silicate, an effect was produced upon the steel so treated and impregnated with silica or silicate, which was remarkable in that the steel was not only prevented from being deteriorated in quality in the heating operation, but was also greatly improved for the purposes for which steel is ordinarily employed.

My present invention is based upon the foregoing discovery and it consists in impregnating manufactured steel with silica, silicate of soda, or other silicate, by heating it to such a degree as to cause it to absorb silica or a silicate.

My invention may conveniently be practiced, either, by coating or covering the steel to be treated, prior to the heating operation, with silica, silicate of soda, or other silicate, either in the form of a solution, or in a dry condition; or, by treating the steel with, or adding to it during the heating operation, silica, or a silicate, and then heating the steel to such a temperature as to cause it to absorb the silica or silicate.

My invention provides a method by which steel may be heated and afterward, if desired, worked, and, although the invention is not necessarily restricted to the treatment of scrap or waste steel, yet it may, with great advantage, be employed in converting scrap or waste steel into a form or forms fit to be utilized for purposes for which scrap or waste steel would otherwise be useless.

In the practice of my invention I prefer to use a solution of silicate of soda or other silicate, or a solution of silica, and to coat the piece or pieces of steel to be treated therewith, prior to the heating operation,—and thereafter, to subject said steel to pressure or treatment between rolls, or under the hammer. The solution of silica or silicate of soda, may, with advantage, be a strong or saturated solution, and it may conveniently be applied to the steel to be treated by dipping the steel into the solution, or by pouring the solution upon the steel.

In the practice of my invention I have found that a temperature sufficiently high to enable me to work the steel between rolls or under the hammer is sufficient to cause the proper impregnation of the steel with the silica or silicate to produce the result desired.

I do not confine myself to the use of a solution of silica, or of a silicate of soda, or of a silicate of any other material, as silica, or a silicate, in a dry condition, may, without departure from my invention, be used, and either of these materials may be applied to the surface of the steel before the heating operation, or be applied or added to the steel during the process of heating it.

In the practice of my invention, I prefer, as already stated, to employ a solution of silica, or of a silicate, to coat the piece or pieces of steel to be treated before the heating operation, for the reason that such practice is convenient and economical, and for the further reason that the product obtained is, perhaps, more homogeneous than that obtained by other methods of practicing the invention.

As a result of the treatment of steel in accordance with my method, the quality of the metal is greatly improved: For example, low grades of Bessemer steel, as well as low grade steels of other varieties, which, before treatment, are utterly unfit to make a cutting tool from, can, after being subjected to the treatment hereinbefore described, be utilized for the manufacture of high class cutting tools, such, for instance, as knife or razor blades;— and repeated experiments in the practice of my method have demonstrated the fact that treatment by impregnation with silica or a silicate greatly improves the constitution of the entire mass of the steel.

I am unable to state the rationale of the effects which are by the practice of my invention produced on the constitution of the steel, and at this time can only say that I know that the described treatment produces a new result which, in my opinion, is caused by the metal becoming impregnated with the silica or silicate employed. I, therefore, in this specification employ the word "impregnate" as the best term known to me to express my idea concerning the result produced.

I am aware that silica, fluor spar, alum, and other substances have been used as welding fluxes, and it is specifically proposed in my Letters Patent hereinbefore referred to, to employ silica or a silicate of soda, or other silicate, as an aid or flux in the making of a welded joint between two pieces of steel.

I am also aware that silica has been added to a molten mass of pig iron for the alleged purpose of removing therefrom sulphur, phosphorus, and arsenic, previous to the puddling of said pig iron.

I am also aware that in and during certain processes of manufacturing steel, silicon has been added to the molten mass, prior to its being cast, to render the steel capable of being cast without flaws or blow-holes, but in the practice of such processes the metal was found not to be in a satisfactory state of fluidity, to be difficult to cast, and to be very brittle when cold.

I am also aware that it has been proposed to treat articles of cast, malleable or wrought iron or Bessemer steel or steel castings to the action of heat when in contact with a mixture of carbon, silica and alumina. My present invention, however, is distinct from all such applications of the substances named, or of similar substances, in that, in its practice, the whole body of the steel is impregnated with the silica or the silicate employed for the purpose of improving its quality and its usefulness in the arts,—and this without reference to the fact that whether or not two pieces of steel have, by the application of silica or a silicate, as a flux, been welded.

Having thus described my invention, I claim:

The process of improving the quality of steel, by the use of silica or a silicate alone, which consists in heating it in the presence of and impregnating it with the silica or the silicate, as specified.

In testimony whereof I have hereunto signed my name this seventh day of June, A. D. 1889.

WILLIAM BULLUS MIDDLETON.

In presence of—
  WM. C. STRAWBRIDGE,
  J. BONSALL TAYLOR.